(12) United States Patent
Douglas et al.

(10) Patent No.: US 6,957,822 B2
(45) Date of Patent: Oct. 25, 2005

(54) TRACTOR UNIT/TRAILER COMBINATION FOR SUSPENDED TRANSPORT OF EQUIPMENT

(75) Inventors: Paul Douglas, Swadlincote (GB); Terence Bratton, Swadlincote (GB)

(73) Assignee: Extec Screens and Crushers Limited, Derbyshire (GB)

( * ) Notice: Subject to any disclaimer, the term of this patent is extended or adjusted under 35 U.S.C. 154(b) by 0 days.

(21) Appl. No.: 10/475,567

(22) PCT Filed: Feb. 19, 2003

(86) PCT No.: PCT/GB03/00765

§ 371 (c)(1),
(2), (4) Date: Oct. 22, 2003

(87) PCT Pub. No.: WO03/072423

PCT Pub. Date: Sep. 4, 2003

(65) Prior Publication Data

US 2004/0135344 A1     Jul. 15, 2004

(30) Foreign Application Priority Data

Feb. 28, 2002    (GB) .................................. 0204687

(51) Int. Cl.[7] ............................................. B62D 53/00
(52) U.S. Cl. .................................. 280/416.1; 280/404
(58) Field of Search ........................... 280/404, 416.1, 280/418.1, 425, 433, 438.1, 504, 506, 482

(56) References Cited

U.S. PATENT DOCUMENTS

| 2,794,565 | A | | 6/1957 | Ratliff |
| 3,285,449 | A | | 11/1966 | Hand |
| 3,806,159 | A | * | 4/1974 | Self et al. ................. 280/423.1 |
| 4,566,714 | A | * | 1/1986 | De Witt et al. ............. 280/404 |
| 5,013,056 | A | * | 5/1991 | Landoll et al. ........... 280/425.2 |
| 5,127,663 | A | * | 7/1992 | Whitehead .................. 280/404 |
| 5,460,332 | A | | 10/1995 | Frick |
| 5,490,854 | A | * | 2/1996 | Fisher et al. ................... 606/88 |
| 5,667,231 | A | * | 9/1997 | Dierks et al. ............. 280/149.2 |
| 6,311,821 | B1 | * | 11/2001 | Douglas ..................... 198/311 |
| 6,471,233 | B1 | * | 10/2002 | Stragier ................... 280/415.1 |
| 2001/0020656 | A1 | | 9/2001 | Frick |

FOREIGN PATENT DOCUMENTS

WO        WO-99/49976        10/1999

* cited by examiner

Primary Examiner—Lesley D. Morris
Assistant Examiner—L. Lum
(74) Attorney, Agent, or Firm—Madson & Metcalf

(57) ABSTRACT

A tractor unit/trailer combination which is capable of carrying out suspended transport of a heavy duty piece of equipment, with the equipment being coupled at its forward end to the tractor unit and at its rear end to the trailer, and in such a way that the equipment remains suspended above the ground while at the same time forming an articulated connection between the tractor unit and the trailer. The tractor unit has a fifth wheel coupling to which the forward end of the piece of equipment can be coupled. The trailer has an inclined support ramp on which the rear end of the piece of equipment can be supported. A coupling plate is provided which is able to couple the forward end of the piece of equipment to the fifth wheel coupling. Upon uncoupling of the piece of equipment from the tractor unit and the trailer, when it has reached its destination, the trailer can then be coupled directly to the tractor unit so as to form a tractor unit/combination.

6 Claims, 2 Drawing Sheets

TRACTOR UNIT/TRAILER COMBINATION FOR SUSPENDED TRANSPORT OF EQUIPMENT

Figure 1:
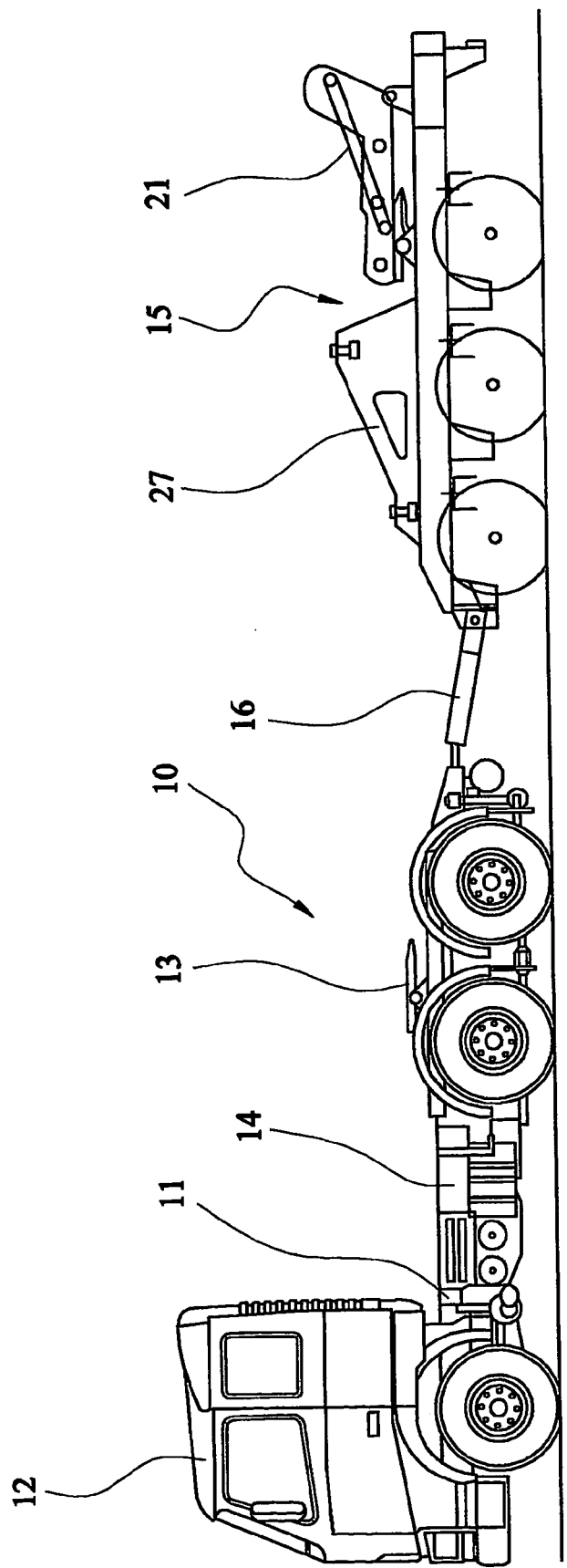

This invention relates to a tractor unit/trailer combination which is intended to transport a large piece of heavy duty equipment as a suspended load out of contact with the ground and suspended between the tractor unit and the trailer.

The invention is primarily concerned with the transport of heavy duty equipment from one site to another, and while maintaining the equipment out of contact with the ground during transport.

It is, of course, well known to transport heavy earth moving equipment on low loaders, but in cases in which the equipment is of substantial height, there can be a problem when the chosen route involves passing under a low bridge.

It is for this reason that the invention is concerned with a tractor unit/trailer combination in which the equipment to be transported is suspended between the tractor unit and the trailer, and out of contact with the ground, whereby the overall height of the equipment is reduced compared with being transported on a low loader.

The type of equipment with which the invention is primarily concerned is a piece of equipment supported by an endless track set and which is manoeuvred on site using the track set. One example is a self propelled crusher machine, made and sold by Extec Screens and Crushers Limited under the trade mark IMPACTOR. This machine is supplied on site with a bulk supply of raw material, and which crushes the raw material into smaller size ranges, and then discharges the crushed material to stockpiles, or to screening plants. The machine has a loading hopper at one end, and a discharge conveyor at its opposite end, and bulk material is supplied to the hopper and then is fed to a crusher unit, and crushed material from the crusher unit is routed to the discharge conveyor.

The hopper is mounted above a rigid framework of the machine, and a forward coupling is provided on the framework which enables the machine to be coupled with the tractor unit. A further coupling is provided on a rigid inclined framework underlying the discharge conveyor, and this framework fits onto a support ramp on the trailer and is secured thereto by the further coupling.

One example of a tractor/trailer combination, for suspended transport of a self-propelled crushing machine, or similar heavy duty machine, is disclosed in more detail in WO99/49976.

One major drawback of existing transport equipment (for suspended transport of heavy duty equipment) is that the trailer unit has to be "customised" to suit the particular piece of equipment, in the sense that it carries permanent features which enable the rear end of the piece of equipment to be seated on the trailer via a releasable coupling arrangement. This means therefore that the trailer is "specific" to the piece of equipment, and when the operator of the equipment (e.g. a crushing machine) requires to transport the equipment from a storage or central depot to site, or from site to site, it is necessary to leave the trailer on site with the piece of equipment. This represents a low utilisation of the trailer, which is a major piece of capital equipment, and which is liable to deteriorate on site due to lack of maintenance and attention.

As an alternative to use of a tractor unit plus a dedicated trailer combination, the operator may chose to use a low loader which has to be hired from specialist firms, which is a major cost, and which will depend upon ready availability.

The present invention has therefore been developed primarily with a view to provide a tractor unit/trailer combination which is capable of carrying out suspended transport of a heavy duty piece of equipment, with the equipment being coupled at its forward end to the tractor unit and at its rear end to the trailer, and in such a way that the equipment remains suspended above the ground while at the same time forming an articulated connection between the tractor unit and the trailer.

According to one aspect of the invention there is provided a tractor unit/trailer combination which is capable of carrying out suspended transport of a heavy duty piece of equipment, with the equipment being coupled at its forward end to the tractor unit and at its rear end to the trailer, and in such a way that the equipment remains suspended above the ground and while at the same time forming an articulated connection between the tractor unit and the trailer, and in which:

the tractor unit has a fifth wheel coupling to which the forward end of the piece of equipment can be coupled;

the trailer has an inclined support ramp on which the rear end of the piece of equipment can be supported;

a coupling plate is provided, which is able to couple the forward end of the piece of equipment to the fifth wheel coupling; and upon uncoupling of the piece of equipment from the tractor unit and the trailer, when it has reached its destination, (a) the coupling plate can be uncoupled from the fifth wheel coupling and (b) the trailer can then be coupled directly to the tractor unit to form a tractor unit/trailer combination.

A tractor unit/trailer combination according to the invention therefore can be used by an operator (of a piece of heavy duty equipment) in order to transport the equipment from a storage depot to site, and then return to the depot as a simple tractor unit/trailer combination. This piece of capital equipment is therefore available for use by the operator with other pieces of equipment, and this is therefore a better utilisation of the capital resource. Also this eliminates the cost of hiring low loaders for use every time a piece of heavy equipment is required to be moved from one site to another.

The tractor unit/trailer combination may also be useful for delivering machines to the docks for export sales, and for use by customers not requiring a bogey system.

Conveniently, the coupling plate is angled in profile, having a substantially horizontal limb which is capable of fitting slidably onto the fifth wheel coupling, and an upwardly extending limb which is capable of being coupled pivotably to a mounting point on a forwardly and upwardly projecting framework at the forward end of the piece of equipment. Preferably, a bracing structure is also provided to connect the framework to the chassis of the tractor unit.

Conveniently, the trailer has a dedicated seating on which the coupling plate can be mounted, when the piece of equipment has been uncoupled from the tractor unit and the trailer, and the tractor and trailer are then coupled together as an articulated unit for return to depot or elsewhere.

To facilitate mounting and de-mounting of the piece of equipment relative to the tractor unit and the trailer, preferably the piece of equipment is provided with two or more jacking legs which can be raised and lowered relative to the chassis of the equipment, for loading and unloading purposes.

The invention is particularly applicable for the suspended transport of a self-propelled piece of equipment, such as a mobile crushing machine having a pair of endless tracks operative to manoeuvre the machine on site.

According to a further aspect of the invention there is provided a method of loading/unloading a heavy duty piece of equipment on/off a tractor unit/trailer combination for transporting the equipment, the combination having a tractor unit provided with a fifth wheel coupling and a trailer having an inclined support ramp, and comprising:

loading the equipment by coupling a forward end of the equipment to the fifth wheel coupling of the tractor unit via a coupling plate which is mounted on the fifth wheel coupling, and mounting the rear end of the equipment on the support ramp of the trailer so that the equipment remains suspended above the ground while at the same time forming an articulated connection between the tractor unit and the trailer;

unloading the equipment by temporarily supporting the equipment above the ground while uncoupling the forward end of the equipment from the coupling plate or the coupling plate from the fifth wheel coupling, and de-mounting the rear end from the support ramp; and storing the coupling plate for re-use by a) attaching or remaining attached to the fifth wheel coupling, b) attaching or remaining attached to the forward end of the equipment or c) mounting the coupling plate on a mounting on the trailer.

Figure 2:
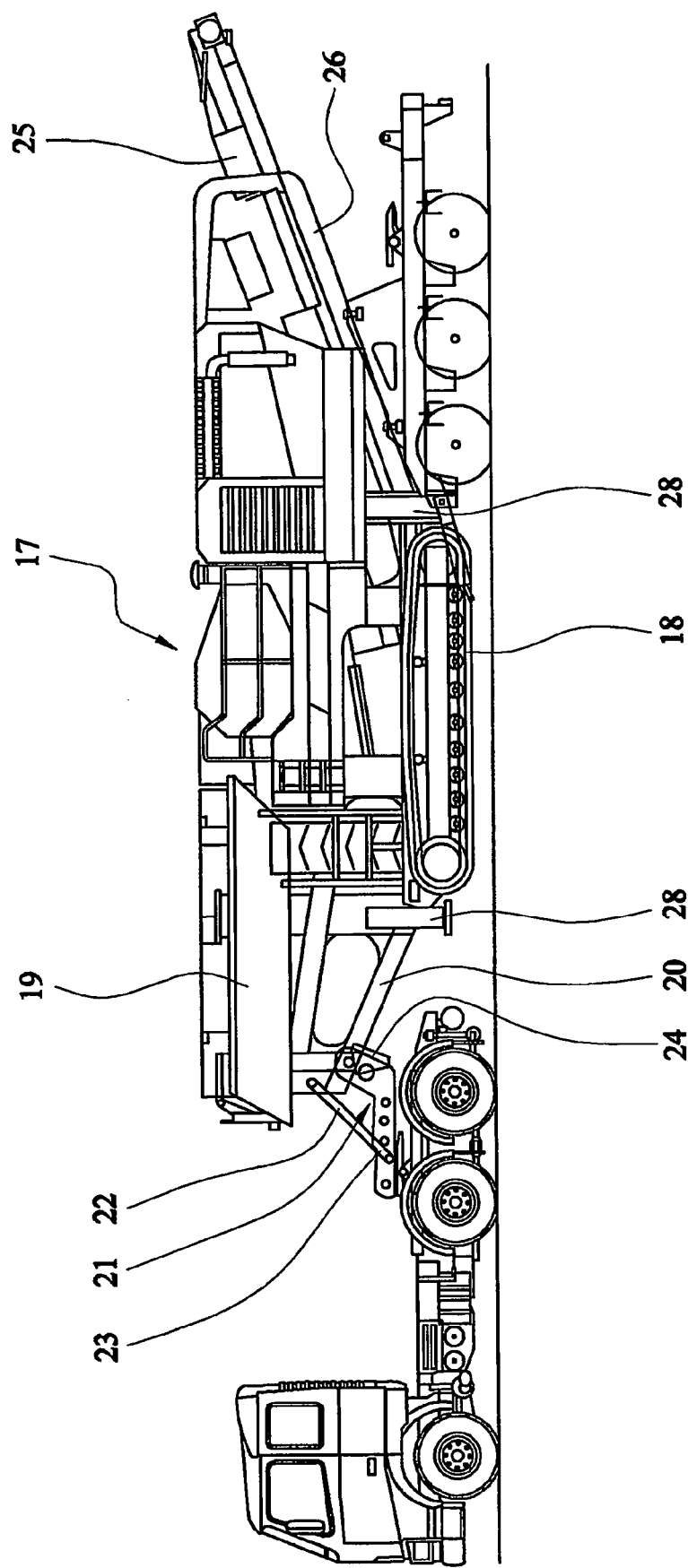

A preferred embodiment of tractor unit/trailer combination according to the invention will now be described in detail, by way of example only, with reference to the accompanying drawings, in which:

FIG. 1 is a side view of the tractor unit and trailer directly coupled together, ready for return to base after having transported a heavy duty piece of equipment to site as a suspended load; and FIG. 2 is a side view, similar to FIG. 1, showing how the heavy duty piece of equipment is suspended as a load between the tractor unit and the trailer, while at the same time forming an articulated connection therebetween.

Referring now to the drawings, a tractor unit/trailer combination according to the invention is designated generally by reference 10 and comprises tractor unit 11 having a cab 12 and a fifth wheel coupling 13 mounted on a chassis 14 of the tractor unit.

FIG. 1 shows a trailer 15 directly coupled with the tractor unit 11 via a towbar 16, and this shows the tractor unit and trailer in a configuration ready for return to base after having delivered a heavy duty piece of equipment to site as a suspended load.

Referring now to FIG. 2, a typical heavy duty piece of equipment is shown by reference 17, and which, by way of example only, is a self-propelled crushing machine having a pair of endless tracks 18 which allow the machine 17 to be manoeuvred on site. The illustrated example of machine 17 is a self-propelled crusher made and sold by Extec Screens and Crushers Limited under the trade mark IMPACTOR.

The machine 17 has a loading hopper 19 at its forward end, and the chassis of the machine includes a rigid inclined support framework at its forward end and which can be coupled with the fifth wheel coupling 13 via angled coupling plate 21 and a brace 22. The angled coupling plate 21 is slidably mounted on the fifth wheel coupling 13, via a horizontal limb 23, and is pivotally connected to the framework 20 via its upwardly extending limb 24. The brace 22 extends also between the framework 20 and a suitable connection on the chassis of the tractor unit 11.

At the rear end of the machine 17, there is a discharge conveyor 25 which can discharge material which has been crushed by the machine, such material either being discharged onto a stockpile or to a screening plant as required.

The chassis of the machine 17 also includes a rigid inclined framework 26 at its rear end, and which fits neatly onto an inclined ramp or seat 27 (see FIG. 1) provided on the trailer 15. A suitable releasable coupling is provided in order to maintain the framework 26 firmly seated on the inclined ramp 27.

The machine 17 is therefore shown in FIG. 2 in a transport position, in which it is a suspended load between the tractor unit 11 and the trailer 15. The machine 17 itself forms part of the articulated connection between the tractor and the trailer, so that all three components form a connected assembly which can readily be moved along the public highway, and in that the machine 17 is a suspended load, with the track set 18 located a required minimum height above the ground, the overall height of the tractor, machine and trailer combination can be kept within legal limits, for transport along the public highway.

After the machine 17 has been transported to site, it can be readily uncoupled from the tractor unit and the trailer, using lowerable jack legs 28 provided on the chassis of the machine. After uncoupling of the forward end of the machine 17 from the tractor unit 11, the coupling plate 21 can then be stored on a suitable mounting on the trailer 15, as shown in FIG. 1.

Alternatively, the coupling plate 21 may be uncoupled from the forward end of the machine 17, and remain attached to the fifth wheel coupling 13; or the coupling plate 21 may be detached from the fifth wheel coupling 13, and remain attached to the forward end of the machine 17. The trailer 15 is then directly coupled with the tractor unit, so that it can return to base in the manner of a conventional tractor/trailer combination.

What is claimed is:

1. A tractor unit/trailer combination which is capable of carrying out suspended transport of a heavy duty piece of equipment, with the equipment being directly coupled at a forward end to the tractor unit and at a rear end to the trailer, and in such a way that the equipment remains suspended above the ground while at the same time forming an articulated connection between the tractor unit and the trailer, and comprising:

a fifth wheel coupling provided on the tractor unit and to which the forward end of the piece of equipment can be directly coupled;

an inclined support ramp on the trailer and on which the rear end of the piece of equipment can be supported; and a coupling plate which is able to couple the forward end of the piece of equipment to the fifth wheel coupling;

whereby upon uncoupling of the piece of equipment from the tractor unit and the trailer, when it has reached a destination, the trailer can then be coupled directly to the tractor unit so as to form a tractor unit/combination.

2. A combination according to claim 1, in which the coupling plate is an angled plate having a substantially horizontal limb slidably mountable on the fifth wheel coupling, and an upwardly extending limb which can be pivotally coupled to a mounting part of a forward rigid framework of the equipment.

3. A combination according to claim 1, in which the coupling plate can be mounted on a secure mounting on the chassis of the trailer, when the trailer is coupled directly to the tractor unit via a drawbar.

4. A combination according to claim 1, in which the coupling plate is uncoupled from the forward end of the equipment, when it has reached its destination.

5. A combination according to claim 1, in which the coupling plate is uncoupled from the fifth wheel coupling, when the equipment has reached its destination.

6. A method of loading/unloading a heavy duty piece of equipment on/off a tractor unit/trailer combination for transporting the equipment, the combination having a tractor unit provided with a fifth wheel coupling and a trailer having an inclined support ramp, and comprising:

loading the equipment by coupling a forward end of the equipment to the fifth wheel coupling of the tractor unit via a coupling plate which is mounted on the fifth wheel coupling, and mounting a rear end of the equipment on the support ramp of the trailer so that the equipment remains suspended above the ground while at the same time forming an articulated connection between the tractor unit and the trailer;

unloading the equipment by temporarily supporting the equipment above the ground while uncoupling the forward end of the equipment from the coupling plate or the coupling plate from the fifth wheel coupling, and de-mounting the rear end from the support ramp; and storing the coupling plate for re-use by a) attaching or remaining attached to the fifth wheel coupling, b) attaching or remaining attached to the forward end of the equipment or c) mounting the coupling plate on mounting on the trailer.

* * * * *